United States Patent Office 3,435,283
Patented Mar. 25, 1969

3,435,283
THERMOSYPHONIC HEAT EXCHANGE DEVICE FOR STABILIZING THE FREQUENCY OF CAVITY RESONATORS
Charles A. Beurtheret and Jacques G. Boissiere, Paris, France; said Beurtheret assignor to Compagnie Francaise Thomson-Houston Hotchkiss-Brandt, and said Boissiere assignor to Society Thomson-Varian, both of Paris, France, both companies of France
Filed Apr. 28, 1966, Ser. No. 545,947
Int. Cl. H01j 23/16
U.S. Cl. 315—32                                    3 Claims

ABSTRACT OF THE DISCLOSURE

The frequency of an electron tube having a cavity resonator is stabilized by a sealed container at least partially filled with cooling liquid. One wall portion of the container is in thermal contact with the cavity resonator. Another wall portion of the container has a flexible diaphragm separating the inside of the container from the ambient atmosphere. A vertical partition is located in the container to provide a thermo-siphon circulation path. A second and smaller partition is located closely adjacent the wall portion of the container which is in thermal contact with the cavity resonator. The electron tube is enveloped in insulating material.

---

The present invention relates to improvements to means for stabilizing the resonance frequency of microwave oscillator tubes, particularly reflex klystrons and in particular to the cooling of such tubes by evaporation of liquid.

It is known that, since the resonance frequency of a klystron tube depends on its temperature, the use of reflex klystron tube as a power oscillator for transmission in microwave telecommunication systems necessitates a stabilization of its resonance frequency and that the most effective and the most simple means hitherto used for this purpose consists in stabilizing the temperature of the external walls of its cavity resonator to a temperature little above the boiling temperature of a liquid under atmospheric pressure, using said liquid as a heat-exchange agent, which boils in contact with said walls and the vapour of which then condenses in an external condenser enabling the condensed liquid to be recovered. The thermal flux which can be dissipated by this means is limited, however, not only because the wall runs the risk of being destroyed by the heating, that is to say by overheating of a film of vapour forming on its surface, but also because, as soon as the boiling becomes somewhat intense, its temperature comprises random local variations which lead to frequency variations in the klystron.

It is likewise known, particularly through United States Patents 2,935,305, 2,935,306 and 2,969,957, that the boiling of a liquid in contact with a hot wall can be stabilized, and the dissipated power considerably increased, by providing said wall with projections which render it essentially anisothermal in the presence of boiling, the liquid coming into contact with its surface at a temperature which is lower by at least 10° C. than its boiling temperature. An application of this system, known under the registered trademark Vapotron, to the cooling of tubes of the klystron type by forced circulation of liquid in an evaporator surrounding their electron collector has been described in copending patent application of Ch. A. Beurtheret Ser. No. 30,720, filed May 19, 1960, now U.S. Patent No. 3,280,897, issued Oct. 25, 1966. This patent applies in particular to the electron discharge tubes which require artificial cooling of several separate parts of their envelope and in which the element to be cooled most vigorously is at earth potential and is situated at the top of the assembly. The various elements to be cooled are sprayed by a single circulation of liquid, in a sufficient quantity for said liquid first to cool, without reaching boiling point, all the elements of the tube subjected to a relatively weak dissipation of power, then, finally, for said liquid to ensure, by partial evaporation, the cooling of the elements over which the greater portion of the calorific power is dissipated.

The compact structure of reflex klystrons does not justify the use of such a device which necessitates the presence of a circulating pump for the liquid or of a vapour condenser situated at a sufficient heighth above the refrigeration circuit to compensate for the loss of pressure imposed by this, as well as a safety device making the feed of the electron tube dependent on the presence of liquid in the evaporator.

The object of the invention is to provide improved means and devices for stabilizing the resonance frequency of a reflex klystron tube in the presence of variations in temperature.

Another object of the invention is to stabilize the operating temperature of a klystron over a wide range of supply power and independently of the ambient temperature by simple and compact means which do not necessitate either external power of supervision.

According to an important feature of the invention, the wall of the cavity resonator of a reflex klystron tube is rendered thermally integral with a heat dissipating wall comprising protuberances, projections, crests, grooves, channels, cuts or the like, brought into contact with a boiling liquid, said wall thus being rendered anisothermal on said contact and being situated at the base of a sealed receptacle, at least partially filled with a liquid, said receptacle itself comprising walls which at least partially constitute a heat exchanger with respect to the ambient air, said receptacle being provided at its upper portion with a flexible diaphragm subject to atmospheric pressure and being divided by a vertical partition, which is completely immersed, into two compartments which intercommunicate through their lower and upper portions, the first comprising said dissipating wall on which the partial boiling of said liquid occurs and constituting the rising condensation column of a thermo-siphon of which the descending cooling column constituted by the second compartment restores the temperature of the liquid to at least 10° C. below its boiling temperature.

In a preferred embodiment, a partition, the height of which is limited substantially to that of the dissipating wall, and at the foot of which there is provided a free passage, is arranged between said vertical partition and said dissipating wall in such a manner as to provide in front of this a volume of liquid which is partially excluded from the circulation of the thermo-siphon in order that its temperature may not depart too far from its boiling point when the ambient temperature is lower than normal.

The invention will be better understood on reading the following description and examining the accompanying drawings in which:

FIG. 4 shows a modification of a device as shown in one of the FIGS. 1 to 3.

FIG. 1 shows a reflex klystron tube 1 with which there is associated a temperature stabilization device 2.

Figure 1:
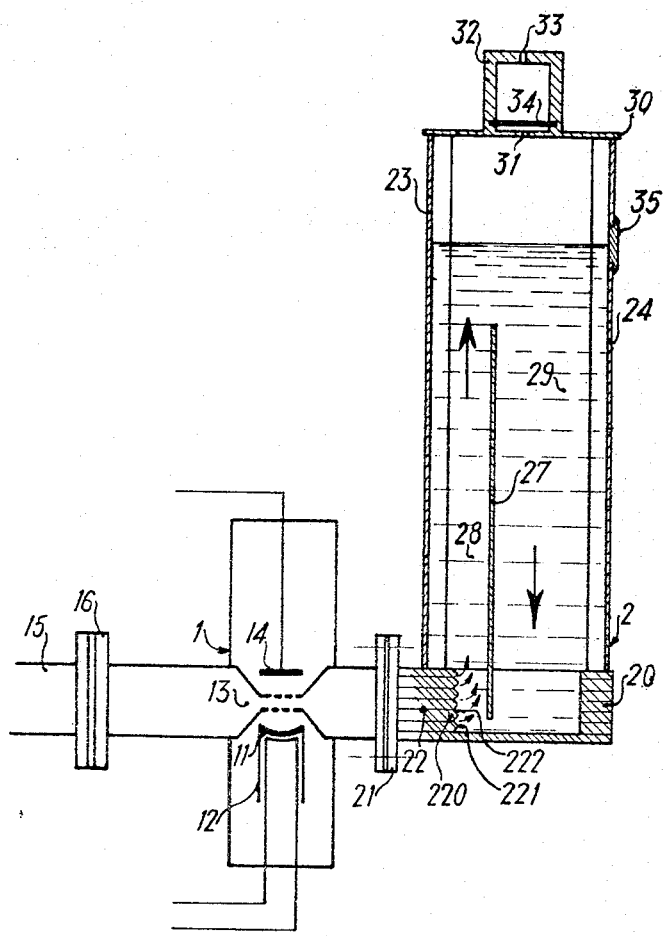
FIG. 1 is a general diagram of a device according to the invention seen in section.

Reflex klystron tube 1 comprises, in known manner, a cathode assembly 11, an electron gun assembly 12, a cavity resonator 13 and a reflector electrode 14. The cavity resonator 13 which constitutes the collector of the reflex-klystron tube 1 is connected to an output waveguide 15 by means of an insulating flange 16, for example of polytetrafluoroethylene, ensuring the sealing and the electrical insulation between the waveguide and the cavity resonator which may be brought to a high voltage.

The stabilization device 2 is fixed by means of a flange 21, assembled with a special grease for thermal contact, at the opposite side of the cavity resonator to the output waveguide.

The stabilization device comprises a hollow block 20 forming its base, vertical walls 23, 24 and 25, 26, for example of corrugated copper sheet, of which the first two are, as a whole, parallel with the plane of the flange 21 and the last two, which are perpendicular thereto, are not visible in FIG. 1, a vertical partition 27, parallel with the plane of flange 21, separating the volume of hollow receptacle 20 into two compartments 28, 29, which are in communication at their lower and upper portions, a cover 30 drilled with a central hole 31 and a cap 32 covering the hole 31 and itself drilled with an aperture 33 for the admission of atmospheric pressure, the passage between the holes 31 and 33 being blocked by a flexible diaphragm 34 arranged across the cap 32. The receptacle thus constituted is filled with a liquid which may be distilled water, or preferably, a liquid which is difficult to freeze such as a fluorinated component, up to a higher level than the upper edge of the separating partition 27. In the region of the upper surface of the cooling fluid a sealed window 35 is formed in the wall 24.

Figure 3:
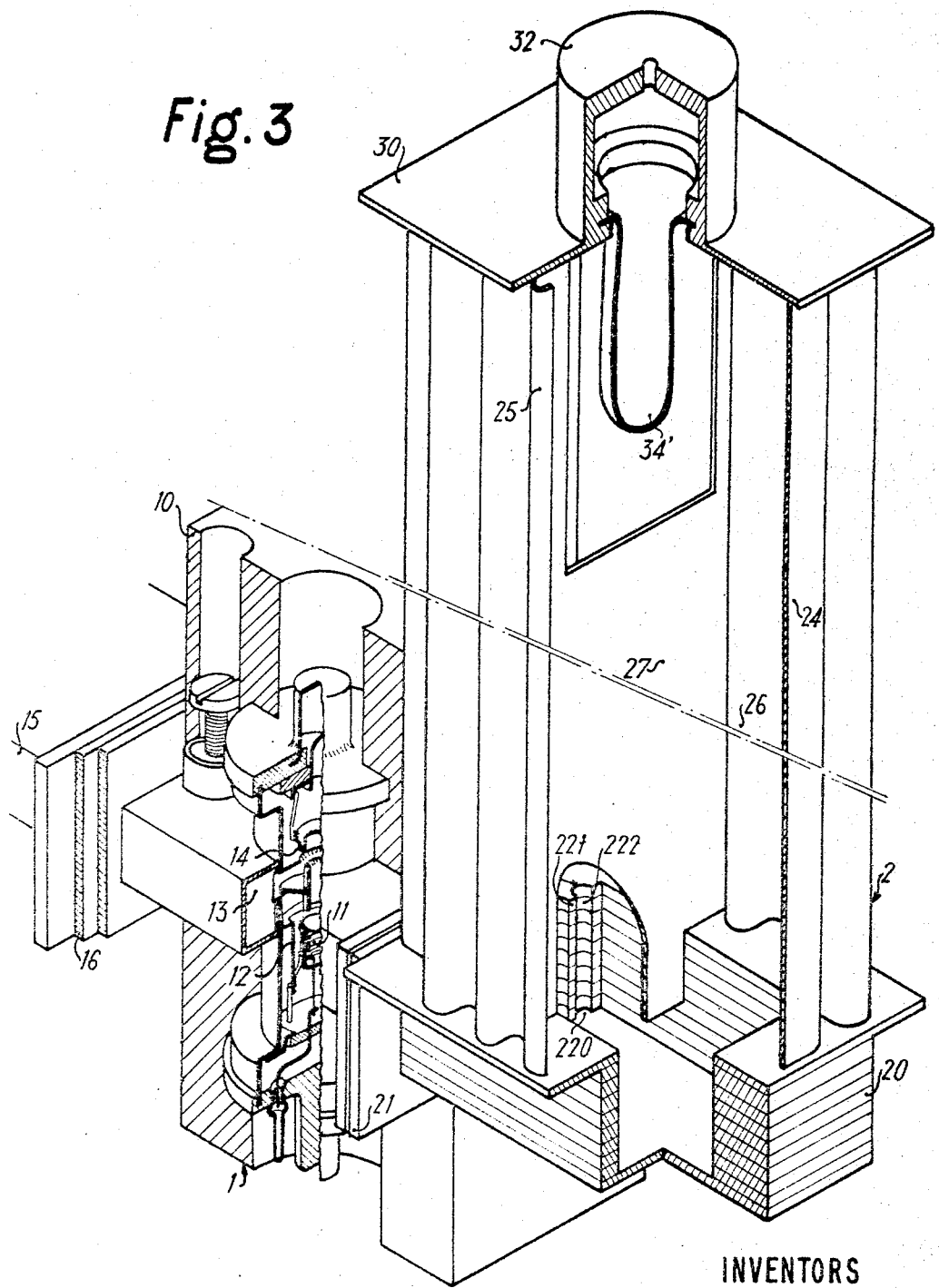
FIG. 3 is a perspective view, partially in section and partially broken away, of a form of construction of a device as shown in FIG. 2.

The block 20 may, to advantage, consist of a stack of small plates of a substance which is a very good conductor of heat, for example copper, brazed to one another, the bottom one being continuous to form the base of the receptacle and the others being hollowed out to form a cup with substantially straight walls. The inner wall 220 of said cup, which is closest to flange 21, is constituted by the external surface of the metal mass 22 formed by said stack of plates which extends as far as said flange. The wall 220, which is thus thermally integral with one wall of the cavity resonator of the klystron, is not plane but comprises projections 221 constituting Vapotron teeth which may be aligned horizontally as indicated in FIG. 1, or vertically as indicated in FIG. 3 or staggered, or in accordance with any other favourable geometry as mentioned in particular in U.S. Patent Nos. 2,935,305; 2,935,306 and 2,969,957 already mentioned. It is known that the effect of these projections is to limit the formation of bubbles of vapour in zones 222 which have a very limited width and are located in the recesses of the projections, while the bottoms of said zones do not receive sufficient heat to sustain a high rate of nucleated boiling, resulting in an intense turbulence of the fluid and the suppression of any random variation in the local temperatures in such a manner that the temperature of the metallic mass 22 rigidly connected to the wall of the cavity resonator of the reflex klystron tube is perfectly stabilized and fixed by the boiling temperature in a manner which is substantially independent of the temperature of the liquid.

Figure 2:
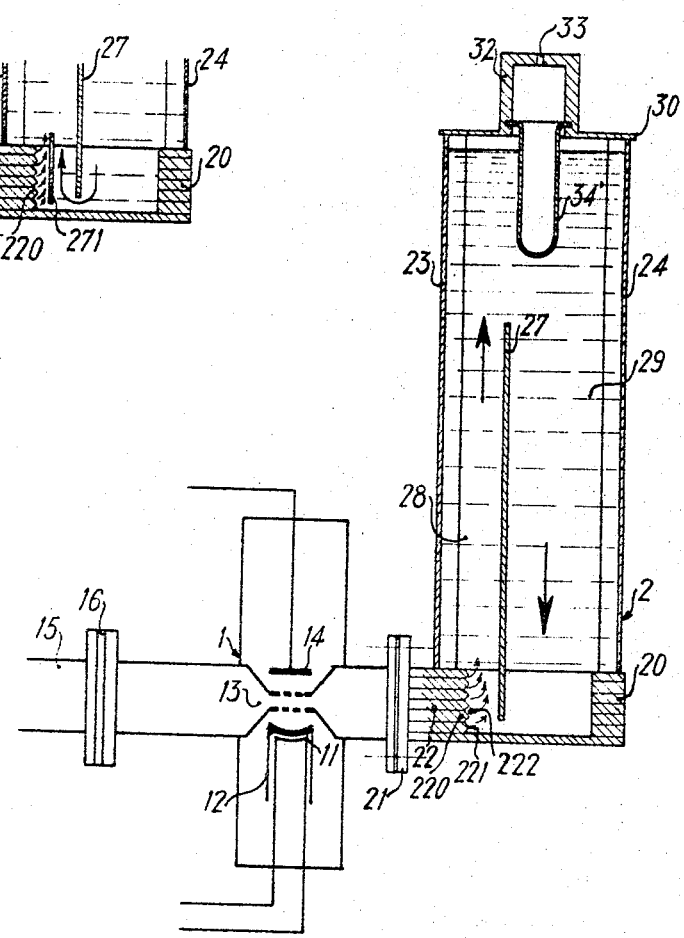
FIG. 2 shows a modification of the device shown in FIG. 1.

FIG. 2 shows a modification of the device in FIG. 1 which constitutes a preferred embodiment of the device according to the invention, according to which the diaphragm for the transmission of atmospheric pressure between aperture 33 in cap 32 and the interior of receptacle 2 is not plane as shown in FIG. 1 at 34 but consists of a small deformable balloon 34' preferably in the shape of a glove finger, which absorbs the variations in volume of the cooling liquid due to thermal expansion and to the formation and disappearance of the bubbles of vapour inside it. Thus the receptacle 2 may be completely or substantially completely filled with liquid and the window for regulating its level may be eliminated.

FIG. 3 shows the form of construction of a reflex klystron tube 1 and of the temperature stabilizing device 2, the same reference numerals designating the same members as in FIGS. 1 and 2.

According to this form of construction, the klystron tube 1 is entirely encased in an insulating material constituting a casing 10, for example of plastic material, adapted to reduce to the minimum its direct heat exchanges with the ambient air. The formation of the bubbles of vapour at the root 222 of the teeth 221 activates the circulation of the liquid by thermo-siphon effect, which the separator 27 encourages by separating the rising circulation portion 28 (FIG. 1) in which the bubbles of vapour condense totally, from the downward circulational portion 29 where the liquid is cooled to a temperature lower, by at least 10° C., than its boiling temperature.

FIG. 4 shows another modification of the embodiments illustrated in FIGS. 1 to 3, according to which a partition 271 parallel with the partition 27 and arranged between this and the dissipating wall 220 forms, in front of the latter, a volume of liquid in which the circulation of the thermo-siphon is reduced in such a manner as to ensure a regular boiling at the base or recess 222 of the projections 221 on said wall (FIG. 2), even in the event of a relatively low ambient temperature producing vigorous cooling of the liquid in circulation.

The height of the partition 271 is limited to the vicinity of the upper portion of the dissipating wall 220 and a free space is formed between its base and the base of the receptacle 2 in such a manner as to ensure suitable cooling of the projections 221.

It is understood that the invention is not limited to the forms of construction which have been specifically described. On the contrary, it extends to all the modifications, particularly those which relate to its application to magnetrons.

What we claim is:

1. A frequency stabilizing device for stabilizing the opereating frequency of a microwave electron tube having at least one cavity reasonator within wide limits of variation in ambient temperature comprising a sealed receptacle filled at least partially with a cooling liquid and having a wall thereof in thermal contact with said cavity resonator, a flexible diaphragm subjected to atmospheric pressure at the upper portion of said receptacle, a vertical partition entirely submerged in said cooling liquid and separating said receptacle into two compartments which intercommunicates at their lower and upper portions, a heat dissipating surface on the part of said wall adjacent to the cavity resonator, said heat dissipating surface including protuberances and recesses in contact with said cooling liquid, the ends of the protuberances having a spacing from the cavity resonator wall larger than the spacing of the bottoms of the recesses from the cavity resonator wall, whereby in operation the compartment containing the heat dissipating surface behaves as the rising condensation column of a thermo-siphon and the other compartment restores the temperature of the cooling liquid below its boiling temperature, and a partition, the height of which is limited substantially to that of said dissipating wall and which does not extend to the bottom of said receptacle, is arranged between said vertical partition and said dissipating wall in such a manner as to form in front of this, a volume partially excluded from the circulation of the thermo-siphon in order that its temperature may not depart too far from its boiling point in the event of a relatively low ambient temperature causing vigorous cooling of said liquid.

2. A frequency stabilizing device as claimed in claim 1, in which said flexible diaphragm is sealed across an aperture provided in said upper portion of said receptacle.

3. A frequency stabilizing device as claimed in claim 1, in which said electron tube has a portion thereof which operates at high temperature and in which said heat dissipating surface in said receptacle is in thermal connection with said high temperature portion of said tube.

References Cited

UNITED STATES PATENTS

| | | | |
|---|---|---|---|
| 2,425,657 | 8/1947 | Tunick | 313—13 X |
| 3,062,507 | 11/1962 | Andrus | 165—11 |
| 2,785,334 | 3/1957 | Garbuny | 315—39 |
| 3,090,433 | 5/1963 | Amorosi et al. | 165—11 |
| 3,306,350 | 2/1967 | Beurtheret | 313—36 X |

JAMES W. LAWRENCE, *Primary Examiner.*

E. R. LA ROCHE, *Assistant Examiner.*

U.S. Cl. X.R.

165—131; 313—35; 315—5